Dec. 4, 1962

E. R. DOAK 3,066,888

ENERGY-ABSORBING PROTECTIVE ELEMENT FOR AIRCRAFT

Filed June 29, 1959

INVENTOR.
EDMOND R. DOAK,
BY
Miketta and Glenny
ATTORNEYS.

United States Patent Office 3,066,888
Patented Dec. 4, 1962

3,066,888
ENERGY-ABSORBING PROTECTIVE ELEMENT
FOR AIRCRAFT
Edmond R. Doak, Los Angeles, Calif.
Filed June 29, 1959, Ser. No. 823,439
5 Claims. (Cl. 244—7)

The present invention relates to a protective element for absorbing energy and thereby preventing transmission of any shock to easily damageable equipment or structural surfaces and particularly to such an element which is permanently deformable and can be easily and quickly replaced.

The present invention has particular application to aircraft and therefore without being limited thereto, the details and advantages of the present invention will be described and discussed in relationship to an aircraft. Most conventional aircraft today have the usual landing gear assembly comprising either two wheels or possibly a tricycle assembly. In using either system, there are many instances where a pilot upon landing on the landing gear assembly inadvertently has the wings of the aircraft inclined with respect to the ground and the extremities of the wings are damaged; or the pilot may lower the tail or aft portion of the aircraft too suddenly and the rudders and elevators of the aircraft may be damaged against the ground.

This condition is even more prevalent in a vertical take-off aircraft having a thrust-generating unit rotatably mounted on either side of the longitudinal axis of the aircraft and on the extremity of the wing. The units are adapted to be rotated between vertical and horizontal positions to enable the aircraft to rise vertically and fly horizontally. Such a vertical take-off aircraft is described in application Serial No. 472,313, filed December 1, 1954, and now abandoned, by Edmond R. Doak. The thrust-generating unit on such a vertical aircraft includes an open-ended tubular duct having a multi-bladed fan or propeller mounted for rotation along the axis of the duct. The fan or propeller has a hub portion which is carried by an elongated, axially positioned streamlined fairing, the tail end of which extends beyond the trailing edge of the duct. The fairing is hollow and houses shafts, gear boxes and other equipment which must be in proper alignment for driving the propeller.

It can be seen that if the vertical take-off aircraft is landing vertically with the units in a vertical position and a gust of wind causes the aircraft to roll about its longitudinal axis, the thrust-generating unit on the extremity of one wing will strike the ground causing severe damage to the gears and shafts in the hollow fairing and misaligning the axis of revolution of the propeller with the axis of the duct. This damage would primarily be inflicted during the rolling action of the aircraft in a faulty landing because the aft end of the axially located fairing would strike the ground first due to its extending beyond the trailing edge of the duct.

The present invention obviates this problem by providing a hollow, energy-absorbing element on the aft portion of the ducted units for contacting the ground only in the event the aircraft makes an improper vertical landing when the units are in the vertical position. The energy-absorbing element is permanently deformable and adapted to be crushed and absorb energy to protect the ducted units. Means are provided for detachably securing the elements to the units in order to easily and quickly replace the elements after being deformed.

An object of the present invention is to provide a novel permanent deformable energy-absorbing element for protecting structural surfaces from damage.

Another object is to provide a downwardly extending, energy-absorbing element on the under surface of a structural portion of an aircraft for protecting such structural portion of the aircraft only in the even the aircraft makes an improper landing.

A further object is to provide an energy-absorbing protective element on the aft portion of thrust-generating units rotatably carried on the extremities of the wings of a vertical take-off aircraft for contacting the ground only in the event the aircraft makes an improper landing when the units are in the vertical position.

Other objects and advantages of this invention will be readily apparent from the following description when considered in connection with the appended drawings.

Figure 1:
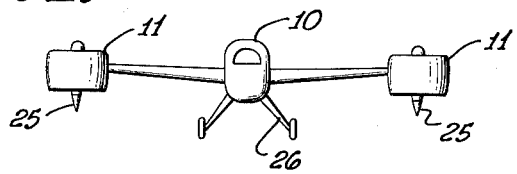
FIG. 1 is a front view of a vertical take-off aircraft having thrust-generating units rotatably carried by the extremities of its wings, where the units are in the vertical position for a vertical landing.
Figure 2:
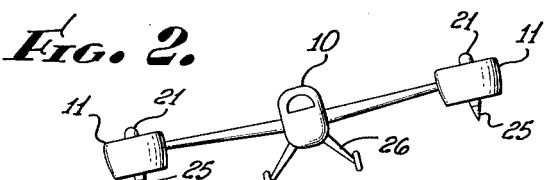
FIG. 2 is a front view similar to FIG. 1 but showing how one of the thrust-generating units could be damaged in a vertical landing when the units are in a plane which is not substantially parallel to the ground.
Figure 3:
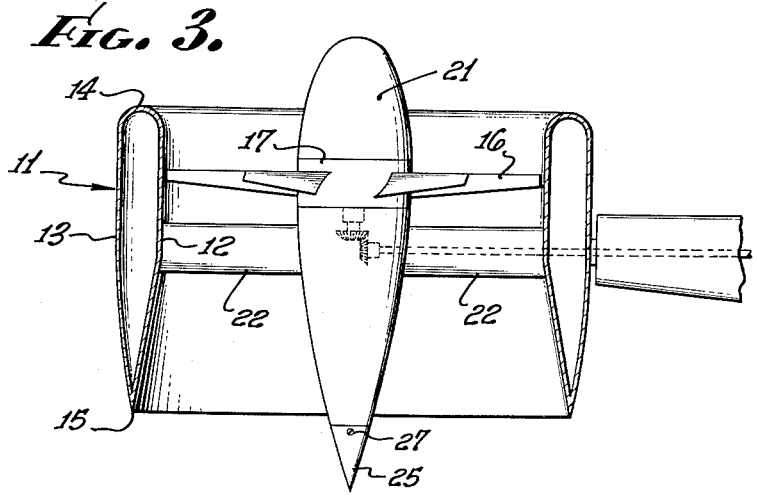
FIG. 3 is a longitudinal section of one of the thrust-generating units shown in FIGS. 1 and 2 in a vertical position with an energy-absorbing protective element carried on the aft end of the axially located fairing.
Figure 4:
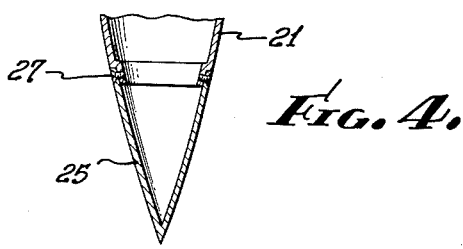
FIG. 4 is a fragmentary section showing one exemplary means of detachably securing the energy-absorbing protective element.

Whether an aircraft is capable of landing horizontally, vertically or in both planes, there are certain structural surfaces spaced from the normal landing gear which are more susceptible to being damaged than other surfaces. In the broadest application, the present invention provides an energy-absorbing element for protecting such structural surfaces only in the event the aircraft makes an improper landing by not landing on its normal landing gear. It is understood that the normal landing gear extends below any surfaces of the aircraft and under normal vertical or horizontal landing conditions is the only portion of the aircraft to engage the ground.

For exemplary purposes only and without being limited thereto, the energy-absorbing element of the present invention is shown and described on a vertical take-off aircraft 10. This type of an aircraft may have a thrust-generating unit 11 rotatably carried at the lateral extremity of each of its wings. The unit is preferably an open-ended tubular duct having a wall, in section, of airfoil design. The duct has inner and outer surfaces 12 and 13 which merge into a rounded frontal surface 14 and terminate into a trailing edge 15. A thrust-generating means 16 is axially positioned within the duct 11 and comprises a multibladed fan or propeller having a rotatable hub portion 17. The hub portion is carried by a streamlined hollow fairing 21 which is held and secured within the duct by a series of hollow contravanes 22 between the mid-portion of the fairing 21 and the inner surfaces 12 of the duct. Well known gear boxes and shafts are carried within the hollow fairing 21 for driving the propeller 16.

As shown in the drawing, the aft portion of the fairing 21 extends beyond the trailing edge 15 of the duct and therefore would strike the ground before any other portion of the duct only when the aircraft made an improper landing in a vertical direction but not landing on its normal landing gear. If the aft portion of the fairing 21 was rigid, the shock from contacting the ground would be instantly transmitted to the gears and shafts within the fairing causing severe damage and misalignment.

The present invention provides an energy-absorbing element 25 on the aft portion of the fairing 21 for contacting the ground and protecting the equipment within the fairing 21. The element 25 is lightweight, hollow and permanently deformable and substantially weaker than the fairing 21. Upon contact with the ground, the element 25 will be crushed and absorb the energy created by the collision. It is preferred that the energy-absorbing element 25 is spaced from the center of gravity of the aircraft when landing and landing gear 26 of the aircraft and is free from structural ribs and struts adapted to transmit shock to the units 11. The element 25 may be formed into various shapes to conform to the particular structural surface to be protected. As shown, it is preferred that the element 25 be cone-shaped so as to form the aft portion of the streamlined fairing 21.

Means are provided for detachably securing the element 25 to the units in order to easily and quickly replace the elements after being deformed. One exemplary means may be screws 27 passing through countersunk openings in the element 25 and threaded into the fairing 21.

It will be obvious to those skilled in the art that the energy-absorbing element 25 may be made of various materials in order to perform its intended function. The material used should be capable of being permanently deformed, crumpled and of absorbing energy while being substantially lightweight. It has been found that moldable plastics are suitable for this purpose. The element may be formed by impregnating a woven, fiberglass cloth with a suitable plastic where the strength of the finished article is sufficient to hold any desired or predetermined shape but has only a minimum of rigidity strength.

Obviously many modifications and variations of the present invention are possible in the light of the above teachings. For example, the energy-absorbing element of the present invention may be provided in a downward direction on the tail of the aircraft to protect delicate aft control surfaces against damage in the event of a faulty landing. It is therefore to be understood that within the scope of the appended claims the invention may be practiced otherwise than as specifically described.

I claim:

1. In an aircraft having a normal landing gear assembly extending below any surfaces of the aircraft and a thrust-generating unit rotatably mounted on either side of the longitudinal axis of the aircraft and laterally spaced from the landing gear assembly for movement between vertical and horizontal positions to enable the aircraft to rise vertically and fly horizontally, the provision of: a lightweight, hollow, permanently deformable, energy-absorbing element located on the aft portion of each of said units for contacting the ground only in the event the aircraft makes an improper vertical landing when the units are in the vertical position, said elements being weaker than said units and adapted to be crushed and absorb energy to protect the units in the event the aircraft is landing and the units are in a plane which is not substantially parallel to the ground, and means for detachably securing said elements to the units in order to easily and quickly replace the elements after being deformed.

2. In an aircraft having a normal landing gear assembly extending below any surfaces of the aircraft, the provision of: a lightweight, hollow, permanently deformable, downwardly extending, energy-absorbing element located on the under surface of a structural portion of the aircraft and laterally spaced from the center of gravity of the aircraft when landing and the landing gear, said element being weaker than said structural portion free from structural ribs and struts adapted to transmit shock to structural portions of the aircraft and adapted to be crushed and absorb energy to protect such structural portion of the aircraft only in the event the aircraft makes an improper landing and the element contacts the ground, and means for detachably securing said element to the aircraft in order to easily and quickly replace the elements after being deformed.

3. In an aircraft having a normal landing gear assembly extending below any surfaces of the aircraft, the provision of: a lightweight, hollow, permanently deformable, downwardly extending, energy-absorbing element of a structural portion of the aircraft and laterally spaced from the center of gravity of the aircraft when landing and the landing gear, said element being weaker than the structural portion of the aircraft adapted to be crushed and absorb energy to protect such structural portion of the aircraft only in the event the aircraft makes an improper landing and the element contacts the ground, and means for detachably securing said element to the aircraft in order to easily and quickly replace the elements after being deformed.

4. An aircraft having a normal landing gear assembly extending below any surfaces of the aircraft, including: a hollow, permanently deformable, downwardly extending, energy-absorbing element of a structural portion of the aircraft and laterally spaced from the center of gravity of the aircraft when landing and from said landing gear, said element being substantially weaker than said structural portion and being adapted to be crushed and absorb energy to protect said structural portion of the aircraft only in the event the aircraft makes an improper landing and the element contacts the ground, and means for detachably securing said element to the aircraft in order to easily and quickly replace the element after being deformed.

5. An aircraft as stated in claim 4, wherein said structural portion comprises a thrust-generating unit rotatably mounted on one side of the longitudinal axis of the aircraft and laterally spaced from the landing gear assembly for movement between vertical and horizontal positions to enable the aircraft to fly horizontally and vertically, said energy-absorbing element being located on the aft portion of said unit for contacting the ground only in the event the aircraft makes an improper vertical landing when the unit is in the vertical position.

References Cited in the file of this patent

UNITED STATES PATENTS

| 1,869,871 | Stout | Aug. 2, 1932 |
| 2,457,205 | Campbell et al. | Dec. 28, 1948 |
| 2,478,847 | Stuart | Aug. 9, 1949 |
| 2,708,081 | Dobson | May 10, 1955 |
| 2,712,420 | Amster et al. | July 5, 1955 |
| 2,926,868 | Taylor | Mar. 1, 1960 |

OTHER REFERENCES

Popular Mechanics, vol. 109, No. 6, June 1958, page 129.

Popular Science, page 140, April 1949.